US008336187B2

(12) United States Patent
Marshall

(10) Patent No.: US 8,336,187 B2
(45) Date of Patent: Dec. 25, 2012

(54) METHOD OF INSERTING FUEL TUBES

(75) Inventor: Chad Marshall, Swepsonville, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/072,639

(22) Filed: Mar. 25, 2011

(65) Prior Publication Data

US 2011/0167612 A1 Jul. 14, 2011

Related U.S. Application Data

(62) Division of application No. 12/043,451, filed on Mar. 6, 2008, now Pat. No. 8,091,193.

(51) Int. Cl.
*B23P 19/02* (2006.01)
*B23P 19/04* (2006.01)

(52) U.S. Cl. .............................. 29/525; 29/450; 29/464

(58) Field of Classification Search .................... 29/235, 29/237, 272, 268, 267, 280, 450, 464, 525, 29/505, 235.5; 7/128; 83/318, 319
See application file for complete search history.

(56) References Cited

U.S. PATENT DOCUMENTS

| | | | | |
|---|---|---|---|---|
| 266,073 | A | 10/1882 | Austin | |
| 974,766 | A | 11/1910 | Gilges | |
| 2,551,401 | A | 5/1951 | Underhill | |
| 3,013,456 | A * | 12/1961 | Ericson | 81/338 |
| 3,130,484 | A | 4/1964 | Zdanis | |
| 3,233,313 | A | 2/1966 | Roth | |
| 3,299,496 | A * | 1/1967 | Christensen | 29/237 |
| 3,599,310 | A * | 8/1971 | Brownlee | 29/237 |
| 3,715,794 | A * | 2/1973 | McCollum et al. | 29/235 |
| 3,845,748 | A | 11/1974 | Eisenberg | |
| 3,969,964 | A | 7/1976 | George et al. | |
| 4,108,474 | A * | 8/1978 | Sigrist | 285/12 |
| 4,227,730 | A | 10/1980 | Alexander et al. | |
| 4,257,135 | A * | 3/1981 | Moebius | 7/125 |
| 4,486,937 | A | 12/1984 | Teramo | |
| 4,738,017 | A | 4/1988 | Teramo | |
| 4,757,588 | A | 7/1988 | Churchich | |
| 4,982,631 | A * | 1/1991 | Lowther | 81/426 |
| 5,062,173 | A | 11/1991 | Collins et al. | |
| 5,084,954 | A | 2/1992 | Klinger | |
| 5,471,728 | A | 12/1995 | Feese et al. | |

(Continued)

OTHER PUBLICATIONS

Office Action of U.S. Appl. No. 12/043,451 dated Jun. 15, 2011.

*Primary Examiner* — Essama Omgba
(74) *Attorney, Agent, or Firm* — Rankin Hill & Clark LLP

(57) ABSTRACT

A fuel insertion tube tool for installing a fuel tube on a barb. The tool has first and second arms that are pivotably attached through an arm pivot axis. Each arm has a grip to engage the fuel tube. A tab extends from the first arm and is pivotably attached to a proximal end of a bar with a pivot pin that defines a bar axis. The bar axis and the arm axis are perpendicular to each other. A hook is disposed at a distal end of the bar for engagement with an attachment site. The tab functions as a fulcrum to reduce the amount of force required to install the fuel tube on the barb. The bar has weight reducing holes and the grips have straight knurls for frictional engagement with the fuel tube.

20 Claims, 4 Drawing Sheets

U.S. PATENT DOCUMENTS

| | | | | |
|---|---|---|---|---|
| 5,566,438 | A * | 10/1996 | Bullock | 29/237 |
| 5,671,520 | A | 9/1997 | Scarborough | |
| 5,979,032 | A | 11/1999 | Roy et al. | |
| 6,389,675 | B1 * | 5/2002 | Tykoski et al. | 29/468 |
| D533,037 | S | 12/2006 | Wu | |
| 7,617,580 | B2 * | 11/2009 | Ellis | 29/237 |
| 7,946,201 | B2 * | 5/2011 | Frazer | 81/427.5 |
| 8,091,193 | B1 * | 1/2012 | Marshall | 29/237 |
| 2010/0095510 | A1 * | 4/2010 | Patterson | 29/428 |
| 2011/0302764 | A1 * | 12/2011 | Smith | 29/505 |

* cited by examiner

FIG. 2
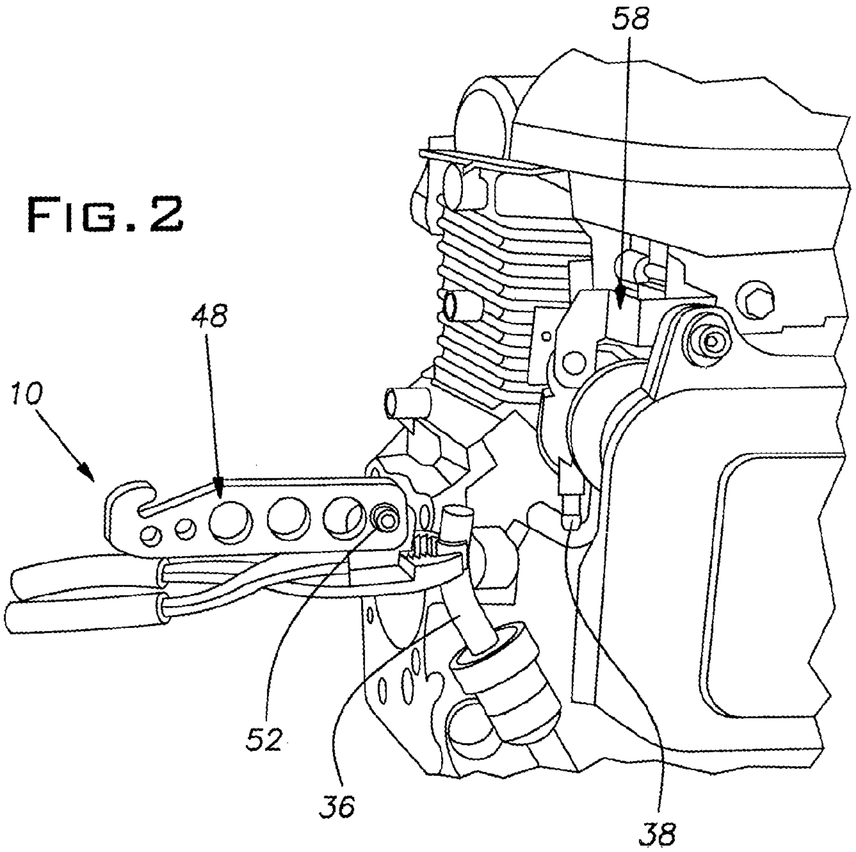
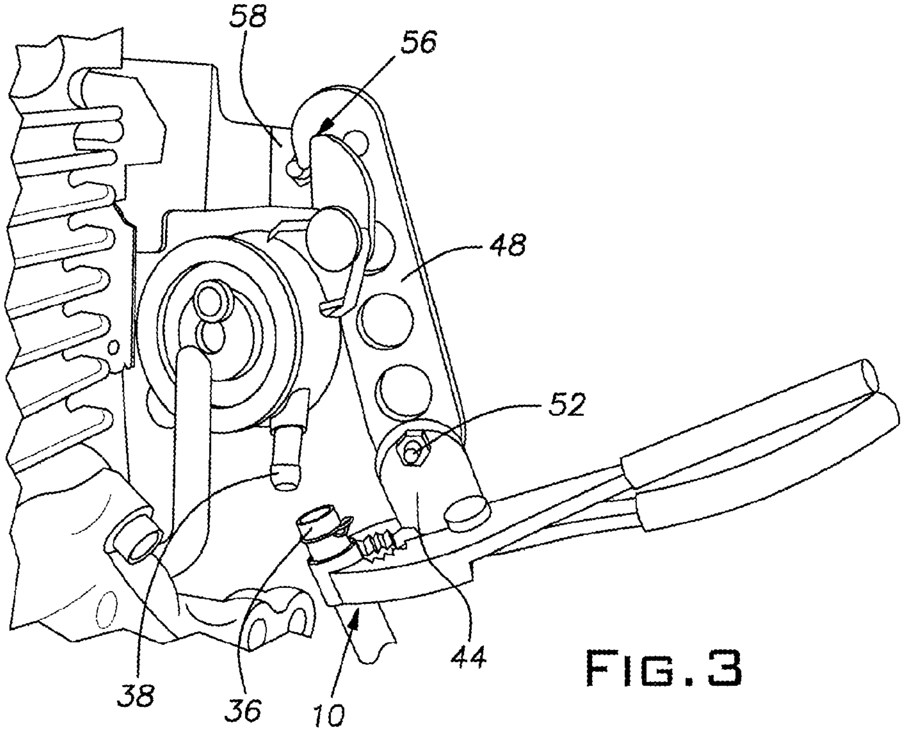
FIG. 3

METHOD OF INSERTING FUEL TUBES

This application is a divisional of U.S. application Ser. No. 12/043,451, now U.S. Pat. No. 8,091,193 filed on Mar. 6, 2008, now U.S. Pat. No. 8,091,193, which is expressly incorporated herein by reference.

BACKGROUND OF THE INVENTION

1. Field of the Invention

The presently disclosed embodiments are directed to the field of hand tools. In particular, the present invention relates to a method and apparatus for installing fuel tubes.

2. Description of Related Art

Many products, specifically internal combustion engines, utilize tubes, lines, or hoses to communicate fluid between different locations. The fluid may be for use in for example, cooling, fueling, hydraulic, lubricating, and vacuum operations. For example, a fuel tube is used to transport fuel between a fuel tank, a fuel pump, and a carburetor of the engine. Alternatively, a radiator hose is used to transport engine coolant between the cooling channels of the engine and the radiator.

Traditionally, at each of the different locations, whether they be the fuel tank/carburetor or engine/radiator, there is a barb for attachment with the tubes, lines, or hoses (hereinafter tubes). The barbs are typically hollow cylindrical extensions with either a smooth or ribbed outer diameter. A hollow inner diameter of the barb allows the fluid to be communicated through the barb. The outer diameter of the barb is sized to be slightly larger than the inner diameter of the tube. The inner diameter of tube is stretched when the tube is slid over the barb to form a leak tight connection and allow fluid communication. Optionally, a hose clamp or spring clip may be placed over the outer diameter of the tube after the tube is installed on the barb. The hose clamp or spring clip helps prevent leakage at the connection between the barb and the tube by further reducing space between the inner diameter of the tube and the outer diameter of the barb and to prevent the tube from slipping off of the barb due to high fluid pressures or other outside influences.

During the initial assembly or subsequent repair of the engine, it may become necessary to install or reinstall the tube onto the barb. Traditionally, this was accomplished by grabbing an end of the tube either, with an unaided hand or with the assistance of pliers or other such tools, aligning the tube end with the barb, and moving the tube end so that the barb was inserted in the tube.

Depending on the difference in size between the outer diameter of the barb and the inner diameter of the tube, insertion of the barb into the tube has varying levels of difficulty. Additionally, the location and orientation of the barb and the tube end can further complicate their joining. Because of the size differences and the location/orientation of the barb and tube, additional force may need to be exerted by the tube installer to slide the tube over the barb. In a manufacturing/assembly environment, the repeated straining of the installer during connection of the tube with the barb is undesirable. A byproduct of this straining may be increased cycle time in installing the tube, incomplete installation of the tube on the barb, and/or damage to the hands or wrists of the installer. As is considered apparent, none of these situations is desirable.

SUMMARY OF THE INVENTION

The difficulties and drawbacks associated with previous types of tube installation methods and apparatuses are overcome in the present method and apparatus for a tool for inserting fuel tubes. In accordance with the present invention, the tool includes first and second arms that are pivotably attached to one another, a tab perpendicularly extending from one of the first and second arms, and a bar having a proximal end that is pivotably attached to the tab through a bar pivot axis. In further accordance with the present invention, the method of installing a tube with the tool includes the steps of engaging the tube with the tool, engaging an attachment site with the hook of the tool, aligning the tube with the barb, and rotating the arms of the tool relative to the bar proximal end to push the tube onto the barb.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIG. 2 is a perspective view of the present invention after engaging a fuel tube;

FIG. 3 is a perspective view of the present invention aligning the fuel tube with a barb;

DETAILED DESCRIPTION OF THE EMBODIMENTS

Figure 1:
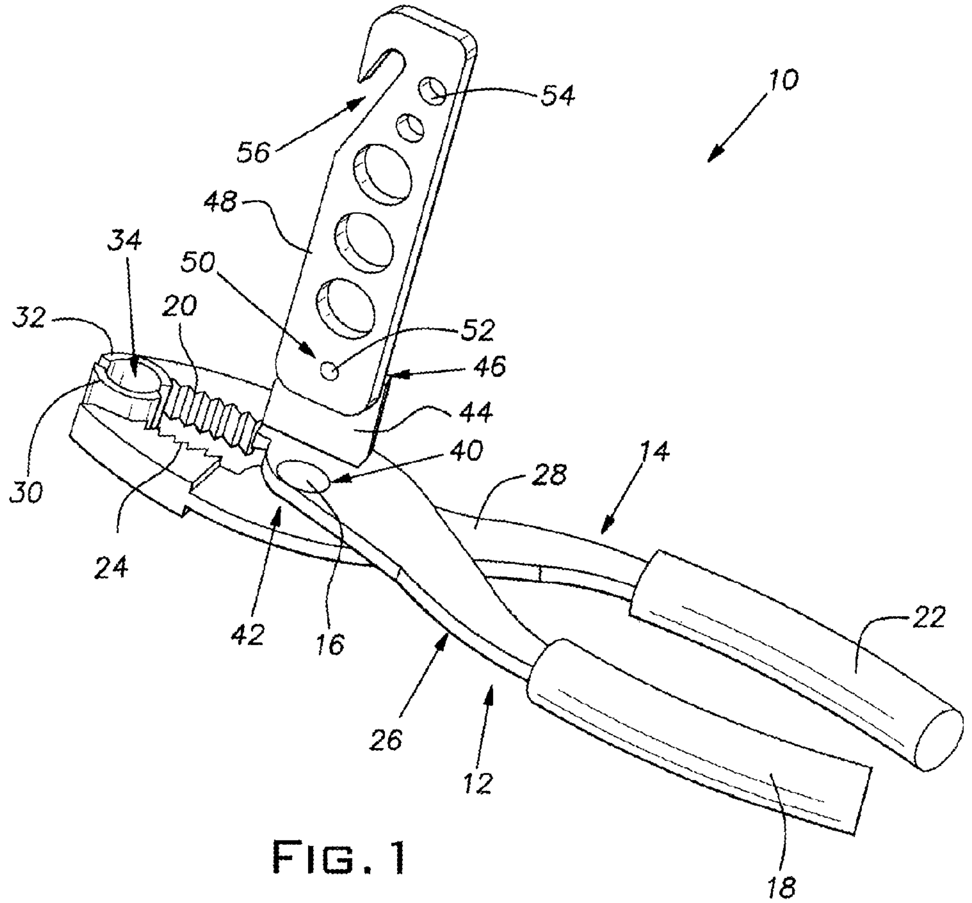
FIG. 1 is a perspective view of the present invention.

As shown in FIGS. 1-4, with particular attention to FIG. 1, a tool 10 of the present invention has first and second arms 12, 14 that are joined by a rivet 16. The first arm 12 has a first handle 18 and a first jaw surface 20, and the second arm 14 has a second handle 22 and a second jaw surface 24. The handles 18, 22 of the arms 12, 14 may be covered with a shock absorbing material to increase user comfort. The first and second arms 12, 14 each have an interior surface 26, 28. The inner surfaces 26, 28 of the first and second arms 12, 14 are generally perpendicular to the first and second jaw surfaces 20, 24, respectively. The first and second arms 12, 14 are of the same or similar shape and structure and are assembled so that their inner surfaces 26, 28 face each other. First and second grips 30, 32 are attached to the first and second jaw surfaces 20, 24, respectively. Each of the grips 30, 32 have knurls 34 for gripping a tube 36 for installation on a barb 38, as shown in FIG. 2.

Although the first and second jaw surfaces 20, 24 are illustrated as having teeth, such teeth are not required. Further, the straight knurls 34 or threads on the grips 30, 32 are generally perpendicular to the teeth. While preferable to aid in gripping the tube 36, these straight knurls 34 are not required.

The grips 30, 32 are each about 150° arcuate sections. However, the grips 30, 32 can be larger or smaller in angular size. For example, the grips 30, 32 could each be 180° in angular size, thereby giving each grip 30, 32 the general appearance of a semicircle. Additionally, the grips 30, 32 may be of a different shape or size to accommodate different shapes or sizes of tubes. When the distance between the first handle 18 and second handle 22 is minimized, the distance between the first grip 30 and the second grip 32 is also minimized. It is preferable that the first grip 30 and the second grip 32 do not touch each other when the tool 10 engages the tube 36. However, although not preferable, the grips 30, 32 may touch each other when the tool 10 engages the tube 36.

Figure 4:
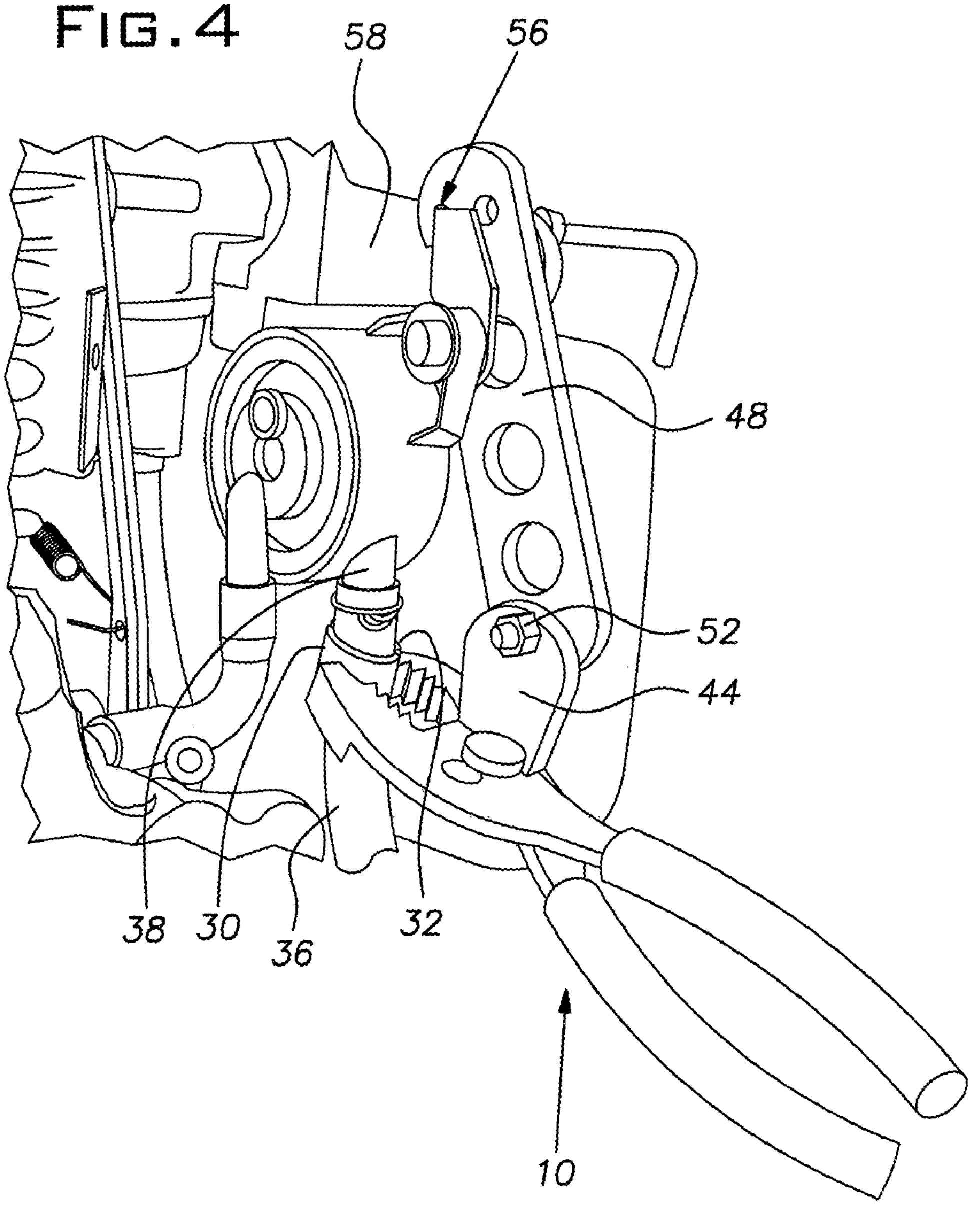
FIG. 4 is a perspective view of the present invention connecting the fuel tube to the barb.

With reference once again to FIG. 1, between each of the handles 18, 22 and the jaw surfaces 20, 24, are first and second bores 40, 42 that align to receive the rivet 16. The rivet 16 defines an arm pivot axis around which the first and second arms 12, 14 pivot, as will be discussed in more detail hereinafter. The first and second bores 40, 42 may be individual circular holes or may be slots or a combination of slots and holes as is seen with slip joint type pliers. Additionally, the rivet 16 can be any type of fastener that would allow the first and the second arms 12, 14 to pivotally engage one another. A tab 44 is fixably attached to the first arm 12 and defines a tab pivot hole 46 for pivotal attachment to a bar 48 with a bar pivot hole 50 by a pivot pin 52. As shown in FIGS. 3-4, the bar 48 preferably defines a series of weight reducing holes 54 and a hook 56. The hook 56 is engagable to an attachment site 58, described hereinafter.

The tab 44 is a piece of flat stock with the tab pivot hole 46 disposed at a distal end thereof. As illustrated, a proximal end of the tab 44 is welded to the first arm 12. The tab 44 may be disposed at various locations on the first arm 12. Instead of welding, the tab 44 may be attached to the first arm 12 with commercially available fastening methods.

The relative position of the pivot pin 52, and hence the tab 44, along the first arm 12 will affect the amount of force required by the user to install the tube 36 on the barb 38. Keeping in mind that the leverage provided is related to the distance between the pivot pin 52 and the handles 18, 22 and the pivot pin 52 and the grips 30, 32, the greater the distance between the pivot pin 52 and the handles 18, 22, the less force that will be required by the user to install the tube 36 on the barb 38.

Additionally, depending upon the application where the tool 10 will be used, it may be more desirable to attach the tab 44 to the second arm 14. Although not illustrated, it is considered apparent that multiple tabs could be disposed on both the first and second arms 12, 14 so as to provide two tabs for pivotal engagement with two bars. This would allow for engagement of the attachment site 58 in two locations. Furthermore, the tabs may have multiple tab pivot holes or slots for attachment with the bars to accommodate attachment locations and barbs differently situated from the illustrated layout.

The bar 48 is also formed from flat stock. At a first, proximal end, the bar pivot hole 50 receives the pivot pin 52, which may comprise a bolt and nut arrangement, as illustrated. Naturally, numerous functionally equivalent pivotal joining methods between the tab 44 and the bar 48 may be used.

At a second, distal end of the bar 48, the hook 56 is provided. The hook 56 allows the bar 48 of the fuel tube insertion tool 10 to be connected to the attachment site 58, such as an engine bracket or other component, that is in the vicinity of the barb 38, as shown in FIGS. 3-4. While the hook 56 is illustrated as a slot, the hook 56 could instead be of a more open shape to provide a better grip for the tool 10 at the attachment site 58. Also alternatively, the hook 56 could be replaced with a clamp pivotally attached to the distal end of the bar 48. The clamp would allow for engagement of attachment locations that otherwise would not be engagable with the hook 56.

Between the first and second ends of the bar 48, the weight reducing holes 54 are formed in the bar 48. The weight reducing holes 54 are not required, but rather help to reduce the weight of the tool 10. It is contemplated that the weight reducing holes 54 could be eliminated, enlarged, or reduced in size.

Figure 5:
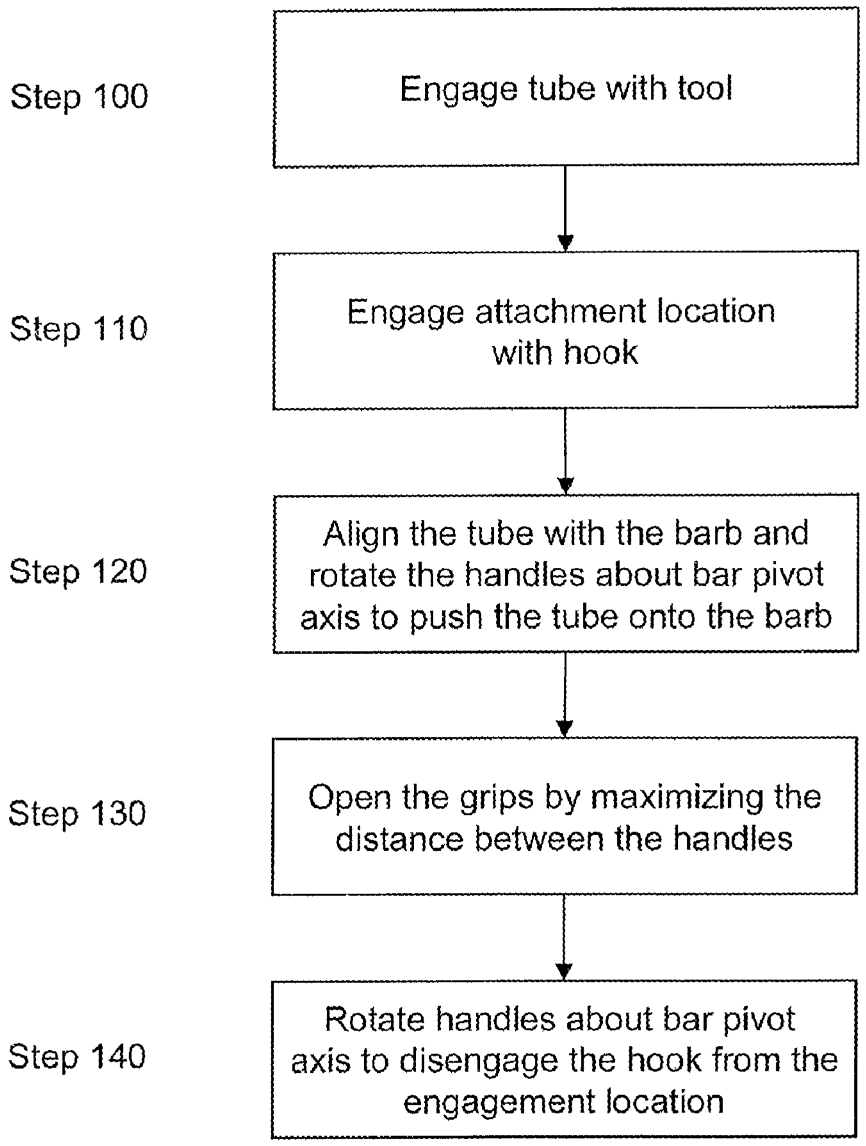
FIG. 5 is a flowchart outlining a method of installing the fuel tube.

Operation of the tool 10 will now be discussed, with reference to FIGS. 1-5. As is shown in FIG. 2, the tube 36 is engaged by the tool 10 (Step 100). This is accomplished by locating the tube 36 between the first and second grips 30, 32. Then, the user squeezes the handles 18, 22 together so as to move the grips 30, 32 toward one another to grip and hold the tube 36. As illustrated in FIG. 3, after engagement of the tube 36, the hook 56 of the bar 48 is attached to the attachment site 58 and aligned with the barb 38 (Step 110). In the present example, the attachment site 58 is a bracket on the engine. It is preferable that the attachment site 58 be an existing structure on the engine. However, it is contemplated that the attachment site 58 could instead be a dedicated structure or jig that is separate from the engine and designed to engage the hook 56. During the steps of locating, gripping, and attaching, the tool 10 is generally horizontal for easy gripping of the tube 36 and to extend the reach of the hook 56 to the attachment site 58. Additionally, during these times, the handles 18, 22 are pivoted about the arm pivot axis or the rivet 16. This allows the grips 30, 32 to effectively grip the tube 36. When viewed from the side of the first arm 12, the handles 18, 22 are raised and preferably rotated from a generally horizontal position about the pivot pin 52, or bar pivot axis, in a counter-clockwise direction, so as to minimize the distance between the handles 18, 22 and the hook 56 to ease engagement of the hook 56 with the attachment site 58. As illustrated in FIG. 5, after attachment of the bar 48 and alignment of the tube 36 with the barb 38, the handles 18, 22 are lowered and rotated about the pivot pin 52 in a clockwise direction to slide the tube 36 over the barb 38 (Step 120). As mentioned hereinbefore, this allows the tool 10 to take advantage of available leverage to install the tube 36 on the barb 38. After the tube 36 has been fully pushed onto the barb 38, the grips 30, 32 are opened (e.g. the distance between the handles 18, 22 is maximized), thereby releasing the tube 36 (Step 130). Then, the handles 18, 22 are raised and pivoted about the tab pivot hole 46 in a counter-clockwise direction to move the grips 30, 32 away from the tube 36 and the barb 38, thereby resulting in the hook 56 being disengaged from the attachment site 58 (Step 140).

The tab 44 functions as a fulcrum between the first arm 12 and the grips 30, 32. This fulcrum action reduces the amount of force required to be exerted by a user of the tool 10 during installation of the fuel tube 36, as compared to if the tool 10 lacked the tab 44 and bar 48. As mentioned hereinbefore, by reducing the amount of force required for installation of the fuel tube 36, straining by the tube installer can be reduced. This reduces the time required to install the tube 36. Furthermore, by easing installation, the tool 10 helps prevent incomplete installation of the fuel tube 36 on the barb 38. The pivot pin 52 defines a bar pivot axis around which the tab 44 and the bar 48 pivot.

It is noted that the arm pivot axis is generally perpendicular to the bar pivot axis. Accordingly, the rivet 16 is generally perpendicular to the pivot pin 52. This layout allows the user of the tool 10 to effectively grip the tube 36 and take advantage of available leverage to install the tube 36 on the barb 38.

Many other benefits will no doubt become apparent from future application and development of this technology. It will be appreciated that various changes in the details, materials and arrangements of parts, which have been herein described and illustrated in order to explain the nature of the invention, may be made by those skilled in the art without departing from the principle and scope of the invention, as expressed in the appended claims.

As will be realized, the invention is capable of other and different embodiments and its several details are capable of modifications in various respects, all without departing from the invention. Accordingly, the drawings and description are to be regarded as illustrative and not restrictive.

What is claimed is:

1. A method of installing a tube on a barb, comprising:

providing a tool having:

arms that are pivotally attached to one another, the arms having handles at a first end and jaw grips at a second, opposite end;

a bar having a distal end with a hook and a proximal end that is pivotally attached to at least one of the arms between the first end and the second end through a pivot pin;

engaging the tube with the tool by moving the jaw grips of the arms toward one another to capture the tube therebetween;

engaging an attachment site with the hook;

aligning the tube with the barb; and rotating the arms relative to the bar proximal end through the pivot pin to move the jaw grips toward the distal end of the bar to push the tube onto the barb.

2. The method of claim 1 further comprising:

releasing the tube by moving the jaw grips of the arms away from one another; and rotating the arms relative to the bar proximal end to move the handles of the arms away from the tube.

3. The method of claim 1 wherein said at least one of the arms to which the proximal end of the bar is pivotally attached includes a tab, the tab orthogonally extending relative to a plane in which the arms pivotally move relative to one another, the proximal end of the bar pivotally attached to the tab via a bar pivot axis, wherein the bar pivot axis is generally parallel to said plane.

4. The method of claim 1 wherein engaging the tube includes positioning the jaw grips of the arms at diametrically opposed positions around the tube and squeezing the handles of the arms toward one another to effect gripping of the tube by the jaw grips.

5. The method of claim 4 wherein the jaw grips include arcuate sections that complementarily mate with an exterior surface of the tube when the tube is gripped by the jaw grips.

6. The method of claim 1 wherein engaging an attachment site with the hook includes engaging the hook onto a bracket on a vehicle engine.

7. The method of claim 1 wherein rotating the arms relative to the bar with the attachment site engaged by the hook provides leverage that facilitates pushing of the tube onto the barb.

8. The method of claim 1 further including:

installing a hose clamp or spring clip over the tube after the tube is pushed onto the barb.

9. A method for installing a first fluid line end onto a second fluid line barbed end in a vehicle, comprising:

engaging the first fluid line end between jaw grips of a pair of pliers arms;

hooking a hook that is pivotably connected to at least one of the pair of pliers arms through a pivot in to an attachment site; and leveraging the first fluid line end onto the second fluid line barbed end by moving the jaw grips toward the hook by pivoting the jaw grips about the pivot in to fluidly and mechanically connect the first fluid line end and the second fluid line barbed end.

10. The method of claim 9 wherein engaging the first fluid line end includes locating the first fluid line end between arcuate sections of the jaw grips and squeezing handle portions of the pair of pliers arms to move the jaw grips toward one another to grip and hold the first fluid line end.

11. The method of claim 9 wherein hooking the hook to the attachment site occurs after the first fluid line end is engaged between the jaw grips.

12. The method of claim 9 further including aligning the first fluid line end with the second fluid line barbed end prior to leveraging the first fluid line end onto the second fluid line barbed end.

13. The method of claim 9 wherein hooking the hook to the attachment site includes hooking the hook onto a bracket of an engine of the vehicle.

14. The method of claim 9 wherein the hook is disposed at a distal end of a bar and a proximal end of the bar is pivotally attached to said at least one of the pair of pliers arms.

15. The method of claim 14 wherein the bar is pivotal about a first pivot axis relative to the pair of pliers arms and the pair of pliers arms are pivotally connected about a second pivot axis, the second pivot axis oriented in perpendicular relation relative to the first pivot axis.

16. The method of claim 15 wherein the proximal end of the bar is pivotally attached to a tab orthogonally extending from said at least one of the pair of pliers arms.

17. The method of claim 9 wherein leveraging the first fluid line end onto the second fluid line barbed end includes rotating the pair of pliers arms about an axis perpendicularly oriented relative to an axis about which the pair of pliers arms are connected to one another.

18. The method of claim 9 further including disengaging the first fluid line end from the jaw grips after the first fluid line end is leveraged onto the second fluid line barbed end.

19. A method for securing an end of a first fluid line to a barbed end of a second fluid line in a vehicle, comprising:

gripping the end of the first fluid line with jaw grips of a set of pliers arms;

attaching a hook that is pivotally connected to the set of pliers arms through a pivot pin to an attachment site, the hook spaced apart from the set of pliers arms and pivotally connected to the pliers arms about a first axis that is perpendicularly oriented relative to a second axis about which the set of pliers arms are pivotable relative to one another; and manipulating the set of pliers arms to slide the end of the first fluid line over the barbed end of the second fluid line while the hook is attached to the attachment site by moving the jaw grips toward the hook by pivoting the jaw grips about the pivot pin, the first axis functioning as a fulcrum that allows the set of pliers arms to leverage the end of the first fluid line over the barbed end of the second fluid line.

20. The method of claim 19 wherein the jaw grips are disposed on one side of the hook and handles of the set of pliers arms disposed on another, opposite side of the hook, the handles moved in a direction away from the attachment site during said manipulating of the set of pliers arms to provide said leverage force.

* * * * *

UNITED STATES PATENT AND TRADEMARK OFFICE

CERTIFICATE OF CORRECTION

PATENT NO. : 8,336,187 B2
APPLICATION NO. : 13/072639
DATED : December 25, 2012
INVENTOR(S) : Chad Marshall It is certified that error appears in the above-identified patent and that said Letters Patent is hereby corrected as shown below:

Col. 5, line 54 of claim 9, replace the word "in" with --pin--.

Col. 5, line 58 of claim 9, replace the word "in" with --pin--.

Signed and Sealed this
Nineteenth Day of February, 2013

Teresa Stanek Rea
*Acting Director of the United States Patent and Trademark Office*